(12) United States Patent
Matano et al.

(10) Patent No.: US 8,835,334 B2
(45) Date of Patent: Sep. 16, 2014

(54) OPTICAL GLASS AND OPTICAL ELEMENT

(75) Inventors: Takahiro Matano, Otsu (JP); Fumio Sato, Otsu (JP)

(73) Assignee: Nippon Electric Glass Co., Ltd., Shiga (JP)

(*) Notice: Subject to any disclaimer, the term of this patent is extended or adjusted under 35 U.S.C. 154(b) by 56 days.

(21) Appl. No.: 13/703,048

(22) PCT Filed: Sep. 12, 2011

(86) PCT No.: PCT/JP2011/070714
§ 371 (c)(1),
(2), (4) Date: Dec. 10, 2012

(87) PCT Pub. No.: WO2012/043209
PCT Pub. Date: Apr. 5, 2012

(65) Prior Publication Data
US 2013/0090225 A1 Apr. 11, 2013

(30) Foreign Application Priority Data

Sep. 28, 2010 (JP) .................. 2010-216558
Dec. 24, 2010 (JP) .................. 2010-287005

(51) Int. Cl.
C03C 3/064 (2006.01)
C03C 3/14 (2006.01)
C03C 3/066 (2006.01)
C03C 3/15 (2006.01)
C03C 3/145 (2006.01)
C03C 3/068 (2006.01)
C03C 3/155 (2006.01)
C03C 4/02 (2006.01)

(52) U.S. Cl.
CPC ... *C03C 4/02* (2013.01); *C03C 3/14* (2013.01); *C03C 3/066* (2013.01); *C03C 3/15* (2013.01); *C03C 3/145* (2013.01); *C03C 3/068* (2013.01); *C03C 3/155* (2013.01); *C03C 3/064* (2013.01)
USPC .................. 501/49; 501/50; 501/51; 501/52; 501/77; 501/78

(58) Field of Classification Search
CPC ............ C03C 3/14; C03C 3/15; C03C 3/155; C03C 3/253; C03C 3/064; C03C 3/068
USPC ............................ 501/49, 50, 51, 52, 77, 78
See application file for complete search history.

(56) References Cited

U.S. PATENT DOCUMENTS

| | | | |
|---|---|---|---|
| 6,620,748 B1 * | 9/2003 | Sugimoto et al. | 501/64 |
| 7,737,064 B2 * | 6/2010 | Fu | 501/73 |
| 2003/0191006 A1 | 10/2003 | Natsugari et al. | |
| 2007/0054794 A1 * | 3/2007 | Nagaoka et al. | 501/65 |
| 2008/0096752 A1 * | 4/2008 | Nagaoka | 501/42 |
| 2009/0069166 A1 | 3/2009 | Fu | |
| 2012/0065051 A1 * | 3/2012 | Matano et al. | 501/42 |
| 2014/0045675 A1 * | 2/2014 | Matano et al. | 501/42 |

FOREIGN PATENT DOCUMENTS

| | | |
|---|---|---|
| JP | 2002-201039 A | 7/2002 |
| JP | 2006-151758 A | 6/2006 |
| JP | 2006-327926 A | 12/2006 |
| JP | 2007-106627 A | 4/2007 |
| JP | 2008-174421 * | 7/2008 |

OTHER PUBLICATIONS

Official Communication issued in International Patent Application No. PCT/JP2011/070714, mailed on Dec. 6, 2011.
English translation of Official Communication issued in corresponding International Application PCT/JP2011/070714, mailed on Apr. 25, 2013.

* cited by examiner

*Primary Examiner* — Karl E Group
(74) *Attorney, Agent, or Firm* — Keating & Bennett, LLP

(57) ABSTRACT

Provided is an optical glass which can satisfy all of the following requirements: (1) it contains no environmentally undesirable components; (2) it can easily achieve a low glass transition point; (3) it has a high refractive index and high dispersion; (4) it can easily provide a glass having a superior visible light transmittance; and (5) it has superior resistance to devitrification during preparation of a preform. The optical glass has a refractive index nd of 2.0 or more, an Abbe's number vd of 20 or less, a glass transition point of 450° C. or below, and a glass composition, in % by mass, of 70 to 90% $Bi_2O_3$, 4 to 29.9% $B_2O_3$, 0.1 to 10% $Li_2O+Na_2O+K_2O$, and 0 to 2.5% $SiO_2+Al_2O_3$ and is substantially free of lead component, arsenic component, F component, $TeO_2$, and $GeO_2$.

13 Claims, 1 Drawing Sheet

[FIG. 1]
[FIG. 2]
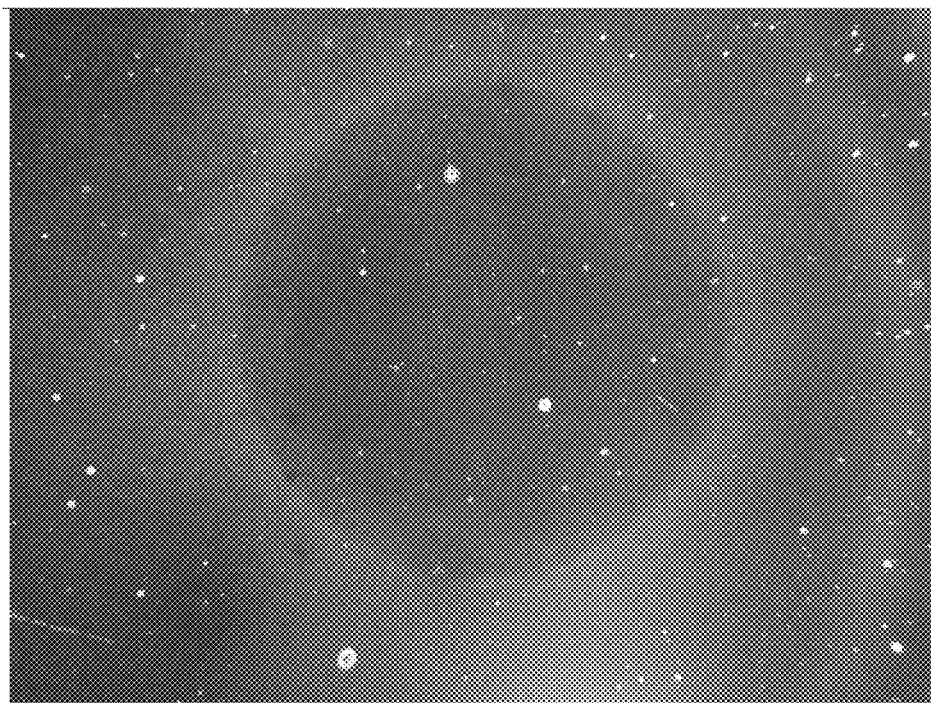

OPTICAL GLASS AND OPTICAL ELEMENT

TECHNICAL FIELD

This invention relates to optical glasses and optical elements. Specifically, the present invention relates to an optical glass and an optical element which have a high refractive index and high dispersion and are therefore suitable for optical pickup lenses in various optical disc systems, image pickup lenses in video cameras and general cameras, and the like.

BACKGROUND ART

Optical pickup lenses in CD®, MD®, DVD®, and various other optical disc systems and image pickup lenses in video cameras and general cameras are generally produced in the following manner.

First, molten glass is dropped from a nozzle tip and a glass in the shape of a droplet is formed (droplet forming). As needed the glass is ground, polished and/or cleaned to prepare a preform glass. Alternatively, molten glass is cast by rapid solidification to form a glass ingot and the glass ingot is ground, polished and cleaned to prepare a preform glass. Subsequently, the preform glass is softened by heat application and press-molded by a precision machined mold to transfer the surface profile of the mold to the glass, thereby producing a lens. Such a molding method is commonly called a press molding method (or precision press molding method).

In employing the press molding method, to precisely press-mold lenses while reducing the degradation of the mold, a glass having a glass transition point as low as possible (at least not higher than 650° C.) is required. Various glasses for this are proposed.

If devitrification occurs during preparation of a preform glass, this means that the fundamental performance of a resultant press-molded lens is lost. Therefore, it is important that the glass should have superior resistance to devitrification. Furthermore, with recent increasing awareness of environmental issues, there is demand for an optical glass in which no harmful substances, such as lead, are used as its glass components. In recent years, it has been considered that for the purpose of cost reduction, optical lenses, such as optical pickup lenses for various optical disc systems and image pickup lenses, are reduced in lens thickness or number of lenses used. In order to achieve such reduction in lens thickness or reduction in number of lenses, a glass material is desired which has a high refractive index and high dispersion (a small Abbe's number). Glasses proposed as having these optical properties include optical glasses containing bismuth as a main component (see, for example, Patent Literatures 1 to 3).

CITATION LIST

Patent Literature

Patent Literature 1: JP-A-2002-201039
Patent Literature 2: JP-A-2007-1066257
Patent Literature 3: JP-A-2006-151758

SUMMARY OF INVENTION

Technical Problem

Generally, in trying to produce a high-refractive index optical glass, a problem may arise in that coloration occurs owing to a component offering a high-refractive index so that the transmittance, particularly the transmittance in the visible range or near-ultraviolet range, is likely to decrease. On the other hand, the addition of a component for inhibiting coloration tends to increase the Abbe's number, i.e., result in low dispersion. As seen above, it is difficult to produce an optical glass having not only a high refractive index and high dispersion but also a superior visible light transmittance.

Therefore, a challenge of the present invention is to provide an optical glass which can satisfy all of the following requirements: (1) it contains no environmentally undesirable components; (2) it can easily achieve a low glass transition point; (3) it has a high refractive index and high dispersion; (4) it can easily provide a glass having a superior visible light transmittance; and (5) it has superior resistance to devitrification during preparation of a preform.

Solution to Problem

The inventors have found from various studies that a glass of a particular composition containing $Bi_2O_3$ and $B_2O_3$ as main components can achieve the above object, and propose the present invention.

Specifically, an optical glass according to the present invention has a refractive index nd of 2.0 or more, an Abbe's number vd of 20 or less, a glass transition point of 450° C. or below, and a glass composition, in % by mass, of 70 to 90% $Bi_2O_3$, 4 to 29.9% $B_2O_3$, 0.1 to 10% $Li_2O+Na_{20}+K_2O$, and 0 to 2.5% $SiO_2+Al_2O_3$ and is substantially free of lead component, arsenic component, F component, $TeO_2$, and $GeO_2$.

The optical glass of the present invention has optical properties of a high refractive index and high dispersion. In addition, a glass can be produced which has a refractive index equivalent to or higher than those of conventional glasses and a greater transmittance. Therefore, the lens thickness and the number of lenses can be reduced, whereby even higher-definition optical devices can be produced. This makes it possible to reduce the component cost of the devices and enhance the performance thereof.

Since the optical glass of the present invention contains a large amount of $Bi_2O_3$ in its composition and also contains $Li_2O_3$, $Na_2O$, and $K_2O$ as alkaline components, it easily achieves a low glass transition point. Therefore, it can be press-molded at low temperatures, which reduces the degradation of the mold due to volatiles of glass components. Furthermore, the optical glass of the present invention has the feature that during press molding, devitrified matter which would inhibit transparency is less likely to be produced.

Moreover, since the optical glass of the present invention is substantially free of lead component, arsenic component, and F component which are harmful components, it is an environmentally desirable glass. In addition, since the optical glass is substantially free of $GeO_2$ and $TeO_2$ which are components that would decrease the transmittance, it easily achieves a high transmittance.

As used in the present invention, "substantially free of lead component, arsenic component, F component, $TeO_2$, and $GeO_2$" means that no amount of these components are deliberately incorporated into the glass and does not mean to fully exclude even the presence of unavoidable impurities. Objectively speaking, this means that the content of each of these components, inclusive of impurities, is below 0.1% by mass.

The "refractive index" as used in the present invention refers to the refractive index at the d-line (587.6 nm) of a helium lamp.

In the optical glass of the present invention, $Bi_2O_3/B_2O_3$ is preferably 8 or less in mass ratio.

By the above composition, a glass having a high transmittance (a good level of coloration) can be obtained.

In one aspect of the optical glass of the present invention, $B_2O_2/(SiO_2+Al_2O_2)$ is 5.5 or more in % by mass.

By the above composition, a glass having an even higher transmittance can be obtained.

In the optical glass of the present invention, the content of $Bi_2O_2+B_2O_2+Li_2O+Na_2O+K_2O$ is preferably 90% by mass or more.

By the above composition, a glass can be easily obtained which has a high refractive index, high dispersion, a low glass transition point, and a superior transmittance as well.

The optical glass of the present invention preferably contains 0 to 15% by mass $TiO_2+WO_3+Nb_2O_5$.

$TiO_2$, $WO_2$, and $Nb_2O_5$ are components that can increase the refractive index but may easily cause a decrease in transmittance. Therefore, by limiting these components to the above range, a high-transmittance glass can be easily obtained.

In the optical glass of the present invention, the content of $Bi_2O_2+B_2O_2+Li_2O+Na_2O+K_2O+TiO_2+WO_2+Nb_2O_5$ is preferably 95% by mass or more.

By the above composition, a glass can be obtained which is particularly superior in terms of properties of high refractive index and high dispersion.

In the optical glass of the present invention, the content of ZnO+BaO is preferably 0 to 2.5% by mass.

Because ZnO and BaO are components that may cause a decrease in transmittance, the limitation of these components to the above range makes it easy to obtain a high-transmittance glass.

In the optical glass of the present invention, the content of ZnO+BaO+CaO+SrO+MgO is preferably 0 to 2.5% by mass.

Because alkaline earth metal oxides and ZnO are components that may cause a decrease in transmittance, the limitation of these components to the above range makes it easy to obtain a high-transmittance glass.

In the optical glass of the present invention, the content of $La_2O_3+Gd_2O_3+Ta_2O_3$ is preferably 0 to 10% by mass.

By the above composition, a glass can be easily obtained which has an even higher transmittance and more superior resistance to devitrification.

In the optical glass of the present invention, the content of $Sb_2O_3$ is preferably 0 to 1% by mass.

In the optical glass of the present invention, the level of coloration $\lambda_{70}$ at a thickness of 10 mm is preferably below 500 nm.

By making the level of coloration $\lambda_{70}$ meet the above range, a glass can be obtained which is superior in transmittance in the visible range or near-ultraviolet range and therefore suitable for various types of optical lenses. As used in the present invention, the "level of coloration $\lambda_{70}$" refers to the wavelength at which the glass reaches a transmittance of 70% when the thickness thereof is 10 mm.

The optical glass of the present invention may be for use in press molding.

An optical element according to the present invention is molded from the above optical glass.

BRIEF DESCRIPTION OF DRAWINGS

FIG. 1 is a photograph of glass sample No. 1 as an example when evaluated for pressability.

FIG. 2 is a photograph of glass sample No. 34 as an example when evaluated for pressability.

DESCRIPTION OF EMBODIMENTS

A detailed description will be given below of the reasons why the content of each component in the optical glass of the present invention is specified as above. Unless otherwise stated, "%" as used in the following description means "% by mass".

$Bi_2O_3$ is an essential component for achieving high refraction and high dispersion, decrease in glass transition point, improved chemical durability, etc., and is also effective for inhibiting devitrification of the glass. The $Bi_2O_3$ content is preferably 70 to 90%, more preferably 75 to 90%, still more preferably 77 to 88%, even more preferably 78 to 87%, and particularly preferably 79 to 86%. If the $Bi_2O_3$ content is below 70%, the glass will be less likely to achieve optical properties of high refraction and low dispersion and will tend to have difficulty in decreasing the glass transition point. On the other hand, if the $Bi_2O_3$ content is above 90%, then because of high volatility of $Bi_2O_3$ the mold will be likely to degrade during press molding and the glass will be likely to fuse to the mold. In addition, the glass will be likely to decrease the chemical durability and decrease the transmittance.

$B_2O_3$ is a component for forming the glass network. Furthermore, it is a component for increasing the glass transmittance and can prevent decrease in transmittance near the ultraviolet range and shift the absorption edge to a shorter wavelength. Particularly, high-refractive index glasses are likely to be given the effect of increasing the transmittance by $B_2O_3$. In addition, $B_2O_3$ is also effective for inhibiting devitrification of the glass. The $B_2O_3$ content is preferably 4 to 29.9%, more preferably 6 to 28%, still more preferably 8 to 27%, and particularly preferably 10 to 26%. If the $B_2O_3$ content is less than 4%, a high-transmittance glass will be difficult to obtain. In addition, the glass will be likely to decrease the chemical durability. On the other hand, if the $B_2O_3$ content is above 29.9%, then because of its ease of increasing the Abbe's number a high-dispersion glass will be difficult to obtain. In addition, the glass will be less likely to achieve a property of a high refractive index.

To obtain a glass having a superior level of coloration in the present invention, it is preferred to control the content ratio between $Bi_2O_3$ and $B_2O_3$. Specifically, $Bi_2O_3/B_2O_3$ (mass ratio) is preferably 8 or less, more preferably 7.5 or less, and particularly preferably 7 or less. If the ratio between these components is above 8, a glass having a superior level of coloration will be difficult to obtain. Furthermore, crystals containing Bi—B as main components will be likely to precipitate, which may increase the liquidus temperature and easily devitrify the glass.

Among alkaline components, $Li_2O$ is most effective in decreasing the softening point. Furthermore, it is a component less likely to increase the liquidus temperature as compared with other alkaline components. Moreover, it is a component capable of decreasing the Abbe's number by the replacement with $B_2O_3$, $SiO_2$, and $Al_2O_3$. However, $Li_2O$ has high phase separability. If its content is too large, the liquidus temperature will increase (the liquid viscosity will decrease), so that devitrified matter may be likely to precipitate to impair the workability. Furthermore, $Li_2O$ is likely to decrease the chemical durability and decrease the level of coloration. In addition, $Li_2O$ is a component that may decrease the refractive index. Therefore, if $Li_2O$ is contained in large amounts, a high-refractive index glass will be difficult to obtain. Hence, the $Li_2O$ content is preferably 0 to 5%, more preferably 0 to 3%, and particularly preferably 0.1 to 1.5%.

$Na_2O$, like $Li_2O$, has the effect of decreasing the softening point. In addition, it is a component capable of decreasing the Abbe's number by the replacement with $B_2O_3$, $SiO_2$, and $Al_2O_3$. However, if its content is too large, the refractive index will tend to considerably decrease and the amount of volatiles formed by $B_2O_3$ and $Na_2O$ during glass melting will tend to increase to promote the occurrence of striae. Furthermore, the liquidus temperature will increase so that devitrified matter may be likely to precipitate in the glass. Therefore, the $Na_2O$ content is preferably 0 to 10% and particularly preferably 0.1 to 5%.

$K_2O$, like $Li_2O$, also has the effect of decreasing the softening point. In addition, it is a component capable of decreasing the Abbe's number by the replacement with $B_2O_3$, $SiO_2$, and $Al_2O_3$. If the $K_2O$ content is too large, the refractive index will tend to considerably decrease and the weatherability will tend to be impaired. Furthermore, the liquidus temperature will increase so that devitrified matter may be likely to precipitate in the glass. Therefore, the $K_2O$ content is preferably 0 to 10% and particularly preferably 0.1 to 5%.

In the optical glass of the present invention, the content of $Li_2O+Na_2O+K_2O$, which are alkaline components, is limited for the purpose of decreasing the glass transition point. Specifically, $Li_2O+Na_2O+K_2O$ is preferably 0.1 to 10% and particularly preferably 0.2 to 5%. If $Li_2O+Na_2O+K_2O$ is smaller than 0.1%, the above effect will be difficult to obtain. If it is larger than 10%, crystals containing Bi—B as main components will be likely to precipitate, which may increase the liquidus temperature, may be likely to devitrify the glass, may be likely to degrade the chemical durability, and may be less likely to offer desired optical properties. This will also cause a decrease in transmittance of the glass.

When the content of $Bi_2O_3+B_2O_3+Li_2O+Na_2O+K_2O$ is as large as 90% or more, preferably 93% or more, particularly 95% or more, a glass can be obtained which has a high refractive index, high dispersion, a low glass transition point, and a superior transmittance as well.

$SiO_2$ is a component that can form the glass network together with $B_2O_3$. Furthermore, it also has the effect of increasing the weatherability, and particularly it is significantly effective in preventing components in glass, such as $B_2O_3$ and alkali metal oxides, from being selectively eluted into water. The $SiO_2$ content is preferably 0 to 2.5% and particularly preferably 0.1 to 2%. If the $SiO_2$ content is above 2.5%, the glass meltability may be impaired to increase the glass melting temperature and thus decrease the transmittance and striae or seeds due to unmelt may be left in the glass to cause the glass to fail to satisfy a desired quality for lens glass.

$Al_2O_3$ is a component that can form the glass network together with $SiO_2$ and $B_2O_3$. Furthermore, it also has the effect of increasing the weatherability, and particularly it is significantly effective in preventing components in glass, such as $B_2O_3$ and alkali metal oxides, from being selectively eluted into water. The $Al_2O_3$ content is preferably 0 to 2.5% and particularly preferably 0.1 to 2%. If the $Al_2O_3$ content is above 2.5%, the glass will be likely to devitrify. In addition, the glass melting temperature may be increased to decrease the transmittance and striae or seeds due to unmelt may be left in the glass to cause the glass to fail to satisfy a desired quality for lens glass.

In the present invention, the content of $SiO_2+Al_2O_3$ is preferably 0 to 2.5%, more preferably 0 to 2%, still more preferably 0 to 1.5%, even more preferably 0 to 1%, and particularly preferably 0.1 to 0.5%. If the content of $SiO_2+Al_2O_3$ is above 2.5%, the glass melting temperature will rise to make glass melting difficult. Furthermore, if the melting temperature rises, the bismuth component will be likely to be reduced to precipitate metal bismuth, so that the glass transmittance will tend to decrease.

To obtain a glass having a high transmittance in the present invention, $B_2O_3/(SiO_2+Al_2O_3)$ is preferably 5.5 or more, more preferably 7 or more, and particularly preferably 10 or more.

The optical glass of the present invention can contain, in addition to the above components, the following components.

$La_2O_3$ is a component that can increase the refractive index without decreasing the transmittance. However, inclusion of large amounts of $La_2O_3$ is undesirable because devitrified matter will be likely to precipitate. The $La_2O_3$ content is preferably 0 to 20% and more preferably 0.1 to 10%. If the $La_2O_3$ content is above 20%, this will impair the resistance to devitrification and make it difficult to obtain a high-dispersion glass.

$Gd_2O_3$, like $La_2O_3$, is a component that can increase the refractive index without decreasing the transmittance. The $Gd_2O_3$ content is preferably 0 to 20%, more preferably 0 to 10%, and particularly preferably 0.1 to 10%. If the $Gd_2O_3$ content is above 20%, this will impair the resistance to devitrification and make it difficult to obtain a high-dispersion glass.

$Ta_2O_5$ has the effect of increasing the refractive index and dispersion without decreasing the transmittance. The $Ta_2O_5$ content is preferably 0 to 20%, more preferably 0 to 15%, and particularly preferably 0.1 to 10%. If the $Ta_2O_5$ content is above 20%, the resistance to devitrification of the glass will be likely to be impaired.

To reduce the coloration in the optical glass, it is preferred to control the content of $La_2O_3+Gd_2O_3+Ta_2O_5$. Specifically, the content of $La_2O_3+Gd_2O_3+Ta_2O_5$ is preferably 0 to 10%, more preferably 0 to 7.5%, still more preferably 0 to 5%, and particularly preferably 0.1 to 2.5%. If the content of $La_2O_3+Gd_2O_3+Ta_2O_5$ is above 10%, the glass will be likely to be colored and likely to devitrify. These components are very rare and expensive materials (rare metals). Therefore, from the viewpoint of reducing the cost, it is preferred that the glass should be substantially free of these components (specifically, the content of them should be less than 0.1%).

$TiO_2$, $WO_3$, and $Nb_2O_5$ are components that are highly effective for increasing the refractive index and also effective for increasing the dispersion. In addition, they have a strong function of reducing the resistance to devitrification relative to $La_2O_3$, $Gd_2O_3$, and $Ta_2O_5$.

Among the above three components, $TiO_2$ is the most effective component for increasing the resistance to devitrification of the glass. However, if its content is too large, the glass transmittance will tend to decrease. Particularly if a large amount (for example, 20 ppm or more) of Fe impurity is contained in the glass, the transmittance will tend to significantly decrease. Therefore, the $TiO_2$ content is preferably 0 to 10%, more preferably 0 to 5%, and particularly preferably 0.1 to 5%. $TiO_2$ has a low rate of decreasing the transmittance relative to $La_2O_3$, $Gd_2O_3$, and $Ta_2O_5$. Therefore, positive addition of $TiO_2$ makes it easy for the glass to obtain optical properties of a high refractive index and high dispersion while maintaining a relatively high transmittance.

$WO_3$, like $TiO_2$, is effective for offering optical properties of a high refractive index and high dispersion and also has the effect of increasing the weatherability. Furthermore, $WO_3$ is a component effective for increasing the resistance to devitrification of the glass, but among the above three components, $WO_3$ is a component most likely to decrease the transmittance. Therefore, the $WO_3$ content is preferably 0 to 10%, more preferably 0 to 5%, still more preferably 0 to 2%, and particularly preferably 0.1 to 1%.

The $Nb_2O_5$ content is preferably 0 to 10%, more preferably 0 to 5%, and particularly preferably 0.1 to 5%. If the $Nb_2O_5$ content is above 10%, devitrified matter containing $Nb_2O_5$ as a main component will be likely to precipitate on the glass surface (surface devitrification) or the glass will be likely to be heterogeneous to generate striae. In addition, the glass transmittance will tend to decrease.

The content of $TiO_2+WO_3+Nb_2O_5$ is preferably 0 to 15% and particularly preferably 0.1 to 10%. If the content of $TiO_2+WO_3+Nb_2O_5$ is above 15%, the transmittance will be likely to significantly decrease.

When the content of $Bi_2O_3+B_2O_3+Li_2O+Na_2O+K_2O+TiO_2+WO_3+Nb_2O_3$ is as large as 95% or more, preferably 96% or more, more preferably 97% or more, still more preferably 98% or more, even more preferably 99% or more, and particularly preferably 99.5% or more, a glass can be obtained which is particularly superior in properties of a high refractive index and high dispersion.

Various components other than the above components may be incorporated into the optical glass of the present invention within a range without impairing the properties of the glass of the present invention. Examples of such other components include CaO, SrO, BaO, ZnO, ZrO, $Y_2O_3$, $Yb_2O_3$, and refining agents.

Alkaline earth metal oxides (RO), such as CaO, SrO, and BaO, act as fluxes and have the effect of avoiding a significant decrease in refractive index and inhibiting increase in Abbe's number. If the content of alkaline earth metal oxides is too large, the liquidus temperature will increase so that devitrified matter will tend to precipitate during melting and molding of the glass to thereby narrow the operation temperature range. As a result, mass production of glass will tend to be difficult. Furthermore, the weatherability will be likely to be impaired, the amount of glass components eluted in an aqueous abrasive cleaner or various cleaning solutions will increase, and the glass surface will significantly alter in high-temperature and high-humidity conditions. In addition, a high-transmittance glass will be difficult to obtain. Therefore, the total content of CaO, SrO, and BaO is preferably 0 to 20%, more preferably 0.1 to 10%, still more preferably 0.1 to 5%, and particularly preferably 0.1 to 3%.

CaO is an effective component for increasing the weatherability and is highly effective for increasing the water resistance and alkali resistance. CaO is a component that does not largely decrease the refractive index; however, if the amount thereof added is large, the glass will be likely to be colored. Therefore, the CaO content is preferably 0 to 10% and particularly preferably 0.1 to 5%.

SrO is a component for increasing the refractive index. Furthermore, it is more effective for increasing the water resistance and alkali resistance of the glass than CaO. Therefore, positive use of SrO makes it possible to obtain a highly weatherable glass. However, if its content is large, the glass will be likely to be colored. Therefore, the SrO content is preferably 0 to 20%, more preferably 0 to 10%, and particularly preferably 0.1 to 5%.

BaO, as compared with CaO, can inhibit rise in liquidus temperature and is highly effective for increasing the water resistance and alkali resistance of the glass. BaO is a component that does not largely decrease the refractive index; however, if its content is large, the glass will be likely to be colored. Therefore, the BaO content is preferably 0 to 20% and particularly preferably 0.1 to 5%.

The glass may contain, aside from CaO, BaO, and SrO, MgO as an RO component in order to increase the refractive index. The MgO content is preferably 0 to 10% and particularly preferably 0.1 to 5%. If the MgO content is above 10%, the glass will be likely to devitrify.

ZnO is a component that can decrease the glass viscosity without decreasing the refractive index. Thus, the glass transition point can be decreased, which makes it possible to obtain a glass less likely to fuse to the mold. Furthermore, ZnO also has the effect of increasing the weatherability. Moreover, because ZnO does not have so strong a tendency to devitrify the glass as alkaline earth metal components (MgO, CaO, SrO, and BaO), it can provide a homogeneous glass even when contained in large amounts. In addition, ZnO is a component less likely to color the glass. The ZnO content is preferably 0 to 10%, more preferably 0 to 8%, and particularly preferably 0.1 to 5%. If the ZnO content is above 10%, the weatherability will, on the contrary, tend to be impaired. In addition, a high-refractive index and high-dispersion glass will be difficult to obtain.

To obtain a high-transmittance glass in the present invention, it is preferred to limit the content of alkaline earth metal oxides and ZnO which may cause a decrease in transmittance. For example, the content of BaO+ZnO is preferably 2.5% or less and particularly preferably 2% or less. Furthermore, the content of CaO+SrO+BaO+MgO+ZnO is preferably 2.5% or less and particularly preferably 2% or less.

$ZrO_2$ is a component for increasing the refractive index. In addition, $ZrO_2$ forms the glass network as an intermediate oxide and, therefore, has the effect of improving the resistance to devitrification (reducing the formation of devitrified matter due to $B_2O_3$ and $La_2O_3$) and the effect of increasing the chemical durability. However, if the $ZrO_2$ content is large, the glass transition point will increase, which may impair the press moldability and may be likely to cause precipitation of devitrified matter containing $ZrO_2$ as a main component. In addition, the Abbe's number will tend to increase to make it difficult to obtain a high-dispersion glass. The $ZrO_2$ content is preferably 0 to 10%, more preferably 0 to 7.5%, and particularly preferably 0.1 to 5%.

$Y_2O_3$ and $Yb_2O_3$ are components that can increase the refractive index but may decrease the dispersion. Furthermore, these components also have the effect of inhibiting phase separation. $Y_2O_3$ and $Yb_2O_3$ can improve the resistance to devitrification by the replacement with $La_2O_3$. Each of the $Y_2O_3$ content and $Yb_2O_3$ content is preferably 0 to 10% and particularly preferably 0.1 to 8%. If either one of the $Y_2O_3$ content and the $Yb_2O_3$ content is above 10%, the glass will be likely to devitrify and will tend to narrow the operation temperature range. Furthermore, striae will be likely to occur in the glass.

Examples of the refining agent include $Sb_2O_3$ and $SnO_2$. Particularly, $Sb_2O_3$ is effective for refining a glass that is melt at low temperatures, and can prevent the glass from being colored with Fe or the like as impurities. However, if the amount of refining agent added is too large, devitrified matter of the refining agent will be likely to be produced. The content of refining agent is preferably 0 to 1% and more preferably 0.001 to 0.1%.

$GeO_2$ is a component for offering optical properties of a high refractive index and high dispersion but may decrease the transmittance to make it difficult to achieve a desired level of coloration. In addition, because $GeO_2$ is an expensive material, the use thereof in large amounts tends to cause a high material cost. Therefore, the optical glass according to the present invention is substantially free of $GeO_2$.

$TeO_2$ is also a component for offering optical properties of a high refractive index and high dispersion but may decrease the transmittance to make it difficult to achieve a desired level of coloration. Therefore, the optical glass according to the present invention is substantially free of $TeO_2$.

It should be avoided on environmental grounds that a lead component (PbO), an arsenic component ($As_2O_2$), and an F component ($F_2$) be substantially introduced into the glass. Therefore, the optical glass according to the present invention is substantially free of these components.

The refractive index (nd) of the optical glass of the present invention is preferably 2.0 or more and particularly preferably 2.05 or more. The Abbe's number (vd) of the optical glass of the present invention is preferably 20 or less and particularly preferably 19 or less. When the glass satisfies these optical properties, it is suitable as a small-color dispersion, high-functionality, small-size optical lens for an optical element.

In the optical glass of the present invention, the level of coloration $\lambda_{70}$ at a thickness of 10 mm is preferably below 500 nm, more preferably 470 nm or less, and particularly preferably 460 nm or less. If the level of coloration $\lambda_{70}$ at a thickness of 10 mm is 500 nm or more, the glass will be poor in transmittance in the visible range or near-ultraviolet range and therefore will be difficult to use for various types of optical lenses.

To control the level of coloration $\lambda_{70}$ at a thickness of 10 mm within the above range, it is effective, as described previously, to control the $Bi_2O_3/B_2O_3$ ratio or limit the contents of components that may decrease the transmittance, such as $Nb_2O_5$, $WO_3$, and $TiO_2$. Alternatively, as will be described later, it is preferred to prevent precipitation of metal bismuth by melting the glass in an oxidative atmosphere. If platinum is mixed as an impurity into the glass, the transmittance will tend to decrease. Therefore, the material for the melting furnace is preferably a material containing the least possible amount of platinum. For example, the preferred material for a melting furnace to be employed is a material containing gold as a main component. When a batch material having a small particle size or a previously vitrified batch material is used, the meltability can be increased to reduce the incorporation of unmelted impurities into the glass.

The optical glass of the present invention preferably has a glass transition point of 450° C. or below, more preferably 425° C. or below, and particularly preferably 420° C. or below. When the glass transition point decreases, press molding can be implemented at low temperatures to prevent the occurrence of problems with the mold, such as contamination of the mold due to mold oxidation or volatilized glass components, and fusion of the glass to the mold.

Next, a description will be given of a method for producing an optical pickup lens, an image pickup lens or the like using a glass of the present invention.

First, glass raw materials are mixed together to give a desired composition and then melted in a glass melting furnace. To produce the optical glass of the present invention, it is necessary to select optimum glass raw materials to give the desired composition and reduce the incorporation of impurities into the glass and to control the glass melting atmosphere. Particularly, bismuth oxide, when melted, is likely to oxidize other components or reduce itself into metal bismuth, causing a decrease in transmittance. Therefore, the glass raw materials are preferably melted in an oxidative atmosphere. To realize an oxidative melting atmosphere, it is preferred to use raw materials containing a large amount of nitrate material, carbonate material, hydrate or the like, each serving as an oxidizing agent, for example, bismuth nitrate, lanthanum nitrate, barium nitrate, or sodium nitrate. Furthermore, when an oxygen-rich gas is introduced into the glass during melting, a more oxidative melting atmosphere is achieved.

If the glass raw materials are melted at high temperatures, bismuth itself will be likely to be reduced to precipitate metal bismuth. Therefore, the melting temperature is preferably as low as possible. Specifically, the melting temperature is preferably not higher than 1200° C., more preferably not higher than 1100° C., and particularly preferably not higher than 1000° C. Particularly when Au is used for the melting member, its melting point is low. For Au, the melting temperature should not be higher than approximately 1060° C. Although no particular limitation is placed on the lower limit, the melting temperature is preferably not lower than 700° C. and particularly preferably not lower than 800° C. in order to melt the glass raw materials enough to vitrify them.

Next, the molten glass is dropped from a nozzle tip and a glass in the shape of a droplet is formed to obtain a preform glass. Alternatively, the molten glass is cast by rapid solidification to form a glass block and the glass block is ground, polished and cleaned to obtain a preform glass.

Subsequently, the preform glass is charged into a precision machined mold and press-molded therein while being subjected to heat application until it becomes a softened state, thereby transferring the surface profile of the mold to the preform glass. In this manner, an optical pickup lens, an image pickup lens or the like can be obtained.

EXAMPLES

Hereinafter, the present invention will be described in detail with reference to examples but is not limited to the examples.

Tables 1 to 7 show examples of the present invention (Samples Nos. 1 to 28 and 34 to 56) and comparative examples (Samples Nos. 29 to 33).

TABLE 1

| (% by mass) | 1 | 2 | 3 | 4 | 5 | 6 | 7 | 8 |
|---|---|---|---|---|---|---|---|---|
| $Bi_2O_3$ | 81.8 | 81.8 | 81.8 | 82 | 82.3 | 83.4 | 82 | 81.2 |
| $SiO_2$ | | 1 | | | | | | |
| $Al_2O_3$ | | | 1 | | | | | |
| $B_2O_3$ | 16.0 | 15 | 15 | 15.4 | 15.4 | 14.5 | 16.3 | 16.1 |
| $Li_2O$ | 0.5 | 0.5 | 0.5 | 0.8 | 0.4 | 0.4 | 0.4 | 0.4 |
| $Na_2O$ | | | | | | | | |
| $K_2O$ | | | | | | | | |
| CaO | | | | | | | 1.2 | |
| SrO | | | | | | | | 2.2 |
| BaO | | | | | | | | |
| MgO | | | | | | | | |
| ZnO | | | | | | | | |
| $La_2O_3$ | | | | | | | | |
| $Gd_2O_3$ | | | | | | | | |
| $Ta_2O_5$ | | | | | | | | |
| $TiO_2$ | 1.7 | 1.6 | 1.6 | 1.7 | | 1.6 | | |

TABLE 1-continued

| (% by mass) | 1 | 2 | 3 | 4 | 5 | 6 | 7 | 8 |
|---|---|---|---|---|---|---|---|---|
| WO₃ |  |  |  |  | 1.7 |  |  |  |
| Nb₂O₅ |  |  |  |  |  |  |  |  |
| ZrO₂ |  |  |  |  |  |  |  |  |
| Ge₂O |  |  |  |  |  |  |  |  |
| Sb₂O₃ | 0.01 | 0.03 | 0.05 | 0.05 | 0.05 | 0.1 | 0.1 | 0.1 |
| Si + Al | 0.0 | 1.0 | 1.0 | 0.0 | 0.0 | 0.0 | 0.0 | 0.0 |
| B/(Si + Al) | — | 15.0 | 15.0 | — | — | — | — | — |
| Li + Na + K | 0.5 | 0.5 | 0.5 | 0.8 | 0.4 | 0.4 | 0.4 | 0.4 |
| Bi + B + Li + Na + K | 98.3 | 97.3 | 97.3 | 98.2 | 98.1 | 98.3 | 98.7 | 97.7 |
| Ti + W + Nb | 1.7 | 1.6 | 1.6 | 1.7 | 1.7 | 1.6 | 0.0 | 0.0 |
| Bi + B + Li + Na + K + Ti + W + Nb | 100.0 | 98.9 | 98.9 | 99.9 | 99.8 | 99.9 | 98.7 | 97.7 |
| Zn + Ba | 0.0 | 0.0 | 0.0 | 0.0 | 0.0 | 0.0 | 0.0 | 0.0 |
| Zn + Ba + Ca + Sr + Mg | 0.0 | 0.0 | 0.0 | 0.0 | 0.0 | 0.0 | 1.2 | 2.2 |
| La + Gd + Ta | 0.0 | 0.0 | 0.0 | 0.0 | 0.0 | 0.0 | 0.0 | 0.0 |
| Bi/B | 5.1 | 5.5 | 5.5 | 5.3 | 5.3 | 5.8 | 5.0 | 5.0 |
| Refractive Index nd | 2.0821 | 2.0833 | 2.0829 | 2.0864 | 2.0802 | 2.1107 | 2.0750 | 2.0745 |
| Abbe's Number | 18.4 | 18.4 | 18.4 | 18.1 | 18.5 | 17.5 | 18.9 | 19.0 |
| Glass Transition Point (° C.) | 400 | 405 | 408 | 385 | 405 | 384 | 410 | 412 |
| Coloration λ₇₀ (nm) | 448 | 453 | 455 | 450 | 451 | 455 | 452 | 454 |

TABLE 2

| (% by mass) | 9 | 10 | 11 | 12 | 13 | 14 | 15 | 16 |
|---|---|---|---|---|---|---|---|---|
| Bi₂O₃ | 82.3 | 80.6 | 80.4 | 79.6 | 78.1 | 80 | 79.8 | 80.3 |
| SiO₂ |  |  |  |  |  |  |  |  |
| Al₂O₃ |  |  |  |  |  |  |  |  |
| B₂O₃ | 16.3 | 16 | 16 | 18.1 | 19.5 | 15.9 | 15.8 | 15.9 |
| Li₂O | 0.4 | 0.4 | 0.4 | 0.4 | 0.4 | 0.4 | 0.4 | 0.4 |
| Na₂O |  |  |  |  |  |  |  |  |
| K₂O |  |  |  |  |  |  |  |  |
| CaO |  |  |  |  |  |  |  |  |
| SrO |  |  |  |  |  |  |  |  |
| BaO |  |  |  |  |  |  |  |  |
| MgO | 0.9 |  |  |  |  |  |  |  |
| ZnO |  |  |  |  |  |  |  |  |
| La₂O₃ |  |  |  |  |  | 2.5 |  |  |
| Gd₂O₃ |  |  |  |  |  |  | 2.8 |  |
| Ta₂O₅ |  |  |  |  |  |  |  | 1.9 |
| TiO₂ |  | 1 | 1 | 1.8 | 1.9 | 1 | 1 | 1.3 |
| WO₃ |  | 1.8 |  |  |  |  |  |  |
| Nb₂O₅ |  |  | 2.1 |  |  |  |  |  |
| ZrO₂ |  |  |  |  |  |  |  |  |
| Ge₂O |  |  |  |  |  |  |  |  |
| Sb₂O₃ | 0.1 | 0.05 | 0.05 | 0.05 | 0.1 | 0.05 | 0.05 | 0.05 |
| Si + Al | 0.0 | 0.0 | 0.0 | 0.0 | 0.0 | 0.0 | 0.0 | 0.0 |
| B/(Si + Al) | — | — | — | — | — | — | — | — |
| Li + K + Na | 0.4 | 0.4 | 0.4 | 0.4 | 0.4 | 0.4 | 0.4 | 0.4 |
| Bi + B + Li + Na + K | 99.0 | 97.0 | 96.8 | 98.1 | 98.0 | 96.3 | 96.0 | 96.6 |
| Ti + W + Nb | 0.0 | 2.8 | 3.1 | 1.8 | 1.9 | 1.0 | 1.0 | 1.3 |
| Bi + B + Li + Na + K + Ti + W + Nb | 99.0 | 99.8 | 99.9 | 99.9 | 99.9 | 97.3 | 97.0 | 97.9 |
| Zn + Ba | 0.0 | 0.0 | 0.0 | 0.0 | 0.0 | 0.0 | 0.0 | 0.0 |
| Zn + Ba + Ca + Sr + Mg | 0.9 | 0.0 | 0.0 | 0.0 | 0.0 | 0.0 | 0.0 | 0.0 |
| La + Gd + Ta | 0.0 | 0.0 | 0.0 | 0.0 | 0.0 | 2.5 | 2.8 | 1.9 |
| Bi/B | 5.0 | 5.0 | 5.0 | 4.4 | 4.0 | 5.0 | 5.1 | 5.1 |
| Refractive Index nd | 2.0748 | 2.0821 | 2.0827 | 2.0540 | 2.0220 | 2.0809 | 2.0804 | 2.0813 |
| Abbe's Number | 19.1 | 18.6 | 18.5 | 19.1 | 19.8 | 18.8 | 18.7 | 18.5 |
| Glass Transition Point (° C.) | 413 | 414 | 413 | 420 | 424 | 410 | 411 | 411 |
| Coloration λ₇₀ (nm) | 453 | 450 | 448 | 444 | 439 | 453 | 455 | 451 |

TABLE 3

| (% by mass) | 17 | 18 | 19 | 20 | 21 | 22 | 23 | 24 |
|---|---|---|---|---|---|---|---|---|
| $Bi_2O_3$ | 81.9 | 82.5 | 81.7 | 81.3 | 81.3 | 81.5 | 81.7 | 80.5 |
| $SiO_2$ | 1.3 | | | | | | | |
| $Al_2O_3$ | | | | | | | | |
| $B_2O_3$ | 14.0 | 15.6 | 15.3 | 15.2 | 15.8 | 14.6 | 15.7 | 14.1 |
| $Li_2O$ | 0.4 | 0.1 | 0.4 | 0.4 | 0.4 | 0.4 | 0.4 | 2.2 |
| $Na_2O$ | | | | 0.8 | | | | |
| $K_2O$ | | | | | 1.2 | | | |
| CaO | | | | | | | | |
| SrO | | | | | | | | |
| BaO | | | | | | 0.7 | | |
| MgO | | | | | | | | |
| ZnO | 0.6 | | | | | | | 1.2 |
| $La_2O_3$ | | | | | | | | |
| $Gd_2O_3$ | | | | | | | | |
| $Ta_2O_5$ | | | | | | | | |
| $TiO_2$ | 1.7 | 1.6 | 1.7 | 1.7 | 1.7 | 3.4 | 1.7 | 1.9 |
| $WO_3$ | | | | | | | | |
| $Nb_2O_5$ | | | | | | | | |
| $ZrO_2$ | | | | | | | 0.5 | |
| $Ge_2O$ | | | | | | | | |
| $Sb_2O_3$ | 0.1 | 0.05 | 0.05 | 0.05 | 0.08 | 0.03 | 0.03 | 0.05 |
| Si + Al | 1.3 | 0.0 | 0.0 | 0.0 | 0.0 | 0.0 | 0.0 | 0.0 |
| B/(Si + Al) | 10.8 | — | — | — | — | — | — | — |
| Li + K + Na | 0.4 | 0.1 | 1.2 | 1.6 | 0.4 | 0.4 | 0.4 | 2.2 |
| Bi + B + Li + Na + K | 96.3 | 98.2 | 98.2 | 98.1 | 97.5 | 96.5 | 97.8 | 96.8 |
| Ti + W + Nb | 1.7 | 1.6 | 1.7 | 1.7 | 1.7 | 3.4 | 1.7 | 1.9 |
| Bi + B + Li + Na + K + Ti + W + Nb | 98.0 | 99.8 | 99.9 | 99.8 | 99.2 | 99.9 | 99.5 | 98.7 |
| Zn + Ba | 0.6 | 0.0 | 0.0 | 0.0 | 0.7 | 0.0 | 0.0 | 1.2 |
| Zn + Ba + Ca + Sr + Mg | 0.6 | 0.0 | 0.0 | 0.0 | 0.7 | 0.0 | 0.0 | 1.2 |
| La + Gd + Ta | 0.0 | 0.0 | 0.0 | 0.0 | 0.0 | 0.0 | 0.0 | 0.0 |
| Bi/B | 5.9 | 5.3 | 5.3 | 5.3 | 5.1 | 5.6 | 5.2 | 5.7 |
| Refractive Index nd | 2.0850 | 2.0980 | 2.0794 | 2.0792 | 2.0861 | 2.0917 | 2.0802 | 2.0878 |
| Abbe's Number | 18.1 | 18.1 | 18.4 | 18.5 | 18.4 | 18.1 | 18.5 | 17.8 |
| Glass Transition Point (° C.) | 406 | 387 | 400 | 402 | 412 | 408 | 414 | 364 |
| Coloration $\lambda_{70}$ (nm) | 459 | 451 | 453 | 453 | 451 | 453 | 455 | 460 |

TABLE 4

| (% by mass) | 25 | 26 | 27 | 28 | 29 | 30 | 31 | 32 |
|---|---|---|---|---|---|---|---|---|
| $Bi_2O_3$ | 85.8 | 81.4 | 85.8 | 85 | 85.3 | 67.2 | 74.4 | 40 |
| $SiO_2$ | | | 2 | | 3.3 | | 4.1 | |
| $Al_2O_3$ | | | | | 1.9 | | | |
| $B_2O_3$ | 13.7 | 16.2 | 11.7 | 13.7 | 9.6 | | 7.9 | 3 |
| $P_2O_5$ | | | | | | | | 12 |
| $Li_2O$ | 0.4 | 0.3 | 0.4 | 0.2 | | 1.4 | 1.6 | |
| $Na_2O$ | | | | | | | | |
| $K_2O$ | | | | | | | | 3 |
| CaO | | 0.3 | | | | 2.7 | | |
| SrO | | | | | | | | |
| BaO | | | | | | 7.4 | 7 | 7 |
| MgO | | | | | | | | |
| ZnO | | | | 0.5 | | 3.9 | | |
| $La_2O_3$ | | | | | | | | |
| $Gd_2O_3$ | | | | | | | 5 | |
| $Ta_2O_5$ | | | | | | | | |
| $TiO_2$ | | 1.7 | | 0.5 | | | | |
| $WO_3$ | | | | | | | | 10 |
| $Nb_2O_5$ | | | | | | | | 25 |
| $ZrO_2$ | | | | | | | | |
| $Ge_2O$ | | | | | | 17.4 | | |
| $Sb_2O_3$ | 0.05 | 0.06 | 0.05 | 0.05 | | | | 0.05 |
| Si + Al | 0.0 | 0.0 | 2.0 | 0.0 | 5.2 | 0.0 | 4.1 | 0.0 |
| B/(Si + Al) | — | — | 5.9 | — | 1.8 | — | 1.9 | — |
| Li + K + Na | 0.4 | 0.3 | 0.4 | 0.2 | 0.0 | 1.4 | 1.6 | 3.0 |
| Bi + B + Li + Na + K | 99.9 | 97.9 | 97.9 | 98.9 | 94.8 | 68.6 | 83.9 | 46.0 |
| Ti + W + Nb | 0.0 | 1.7 | 0.0 | 0.5 | 0.0 | 0.0 | 0.0 | 35.0 |

TABLE 4-continued

| (% by mass) | 25 | 26 | 27 | 28 | 29 | 30 | 31 | 32 |
|---|---|---|---|---|---|---|---|---|
| Bi + B + Li + Na + K + Ti + W + Nb | 99.9 | 99.6 | 97.9 | 99.4 | 94.8 | 68.6 | 83.9 | 81.0 |
| Zn + Ba | 0.0 | 0.0 | 0.0 | 0.5 | 0.0 | 11.3 | 7.0 | 7.0 |
| Zn + Ba + Ca + Sr + Mg | 0.0 | 0.3 | 0.0 | 0.5 | 0.0 | 14.0 | 7.0 | 7.0 |
| La + Gd + Ta | 0.0 | 0.0 | 0.0 | 0.0 | 0.0 | 0.0 | 5.0 | 0.0 |
| Bi/B | 6.3 | 5.0 | 7.3 | 6.2 | 8.9 | — | 9.4 | 4.0 |
| Refractive Index nd | 2.1598 | 2.0812 | 2.1602 | 2.1468 | 2.0889 | 2.0380 | 2.0110 | 2.0130 |
| Abbe's Number | 17.1 | 18.5 | 17.1 | 17.3 | 18.0 | 18.2 | 19.7 | 16.2 |
| Glass Transition Point (° C.) | 365 | 418 | 372 | 370 | 405 | 423 | 394 | 520 |
| Coloration $\lambda_{70}$ (nm) | 460 | 450 | 463 | 458 | 516 | 515 | 500 | 473 |

TABLE 5

| (% by mass) | 33 | 34 | 35 | 36 | 37 | 38 | 39 | 40 |
|---|---|---|---|---|---|---|---|---|
| $Bi_2O_3$ | 71.5 | 75.8 | 80 | 78.8 | 88.2 | 86.2 | 84.2 | 81.8 |
| $SiO_2$ | | | | | | | | |
| $Al_2O_3$ | | | | | | | | |
| $B_2O_3$ | 16.5 | 16.7 | 19.3 | 20 | 8 | 10 | 12 | 15.5 |
| $Li_2O$ | | 0.5 | 0.2 | 0.2 | 0.2 | 0.2 | 0.2 | |
| $Na_2O$ | | | | | | | | 0.8 |
| $K_2O$ | | | | | | | | |
| CaO | | 2.0 | | | | | | |
| SrO | | | | | | | | |
| BaO | | 1.0 | | | | | | |
| MgO | | | | | | | | |
| ZnO | 3 | | | | 2 | 2 | 2 | |
| $La_2O_3$ | 6 | 1.0 | | | | | | |
| $Gd_2O_3$ | | | | | | | | |
| $Ta_2O_5$ | 2 | | | | | | | |
| $TiO_2$ | | 2.0 | 0.5 | | 1.5 | 1.5 | 1.5 | 1.7 |
| $WO_3$ | | | | 1 | | | | |
| $Nb_2O_5$ | | 1.0 | | | | | | |
| $ZrO_2$ | 1 | | | | | | | |
| $Ge_2O$ | | | | | | | | |
| $Sb_2O_3$ | 0.05 | | | 0.03 | 0.1 | 0.1 | 0.1 | 0.1 |
| $SnO_2$ | | 0.05 | 0.05 | | | | | |
| Si + Al | 0.0 | 0.0 | 0.0 | 0.0 | 0.0 | 0.0 | 0.0 | 0.0 |
| B/(Si + Al) | — | — | — | — | — | — | — | — |
| Li + K + Na | 0.0 | 0.5 | 0.2 | 0.2 | 0.2 | 0.2 | 0.2 | 0.8 |
| Bi + B + Li + Na + K | 88.0 | 93.0 | 99.5 | 99.0 | 96.4 | 96.4 | 96.4 | 98.1 |
| Ti + W + Nb | 0.0 | 3.0 | 0.5 | 1.0 | 1.5 | 1.5 | 1.5 | 1.7 |
| Bi + B + Li + Na + K + Ti + W + Nb | 88.0 | 96.0 | 100.0 | 100.0 | 97.9 | 97.9 | 97.9 | 99.8 |
| Zn + Ba | 3.0 | 1.0 | 0.0 | 0.0 | 2.0 | 2.0 | 2.0 | 0.0 |
| Zn + Ba + Ca + Sr + Mg | 3.0 | 3.0 | 0.0 | 0.0 | 2.0 | 2.0 | 2.0 | 0.0 |
| La + Gd + Ta | 8.0 | 1.0 | 0.0 | 0.0 | 0.0 | 0.0 | 0.0 | 0.0 |
| Bi/B | 4.3 | 4.5 | 4.1 | 3.9 | 11.0 | 8.6 | 7.0 | 5.3 |
| Refractive Index nd | 2.0310 | 2.0021 | 2.0016 | 2.0001 | 2.2064 | 2.1802 | 2.1307 | 2.0721 |
| Abbe's Number | 20.4 | 19.8 | 19.9 | 19.9 | 17.1 | 17.5 | 17.8 | 18.4 |
| Glass Transition Point (° C.) | 460.0 | 449 | 445 | 448 | 385 | 395 | 404 | 415 |
| Coloration $\lambda_{70}$ (nm) | 440 | 449 | 438 | 435 | 458 | 455 | 453 | 448 |

TABLE 6

| (% by mass) | 41 | 42 | 43 | 44 | 45 | 46 | 47 | 48 |
|---|---|---|---|---|---|---|---|---|
| $Bi_2O_3$ | 81.8 | 82.6 | 82.9 | 82.4 | 83.5 | 80.6 | 80.6 | 81 |
| $SiO_2$ | | | | | | | | |
| $Al_2O_3$ | | | | | | | | |
| $B_2O_3$ | 14.7 | 16.5 | 16.6 | 15.6 | 13.7 | 15.1 | 16.5 | 15.2 |
| $Li_2O$ | | | 0.4 | 0.4 | 1 | 0.9 | 0.4 | 0.4 |
| $Na_2O$ | 1.6 | 0.7 | | | | | 0.3 | |
| $K_2O$ | | | | | | | | |
| CaO | | | | | | | | |
| SrO | | | | | | | | 0.8 |

TABLE 6-continued

| (% by mass) | 41 | 42 | 43 | 44 | 45 | 46 | 47 | 48 |
|---|---|---|---|---|---|---|---|---|
| BaO | | | | | | 1.4 | | |
| MgO | | | | | | | | |
| ZnO | | | | | | | 2.0 | 0.9 |
| $La_2O_3$ | | | | | | | | |
| $Gd_2O_3$ | | | | | | | | |
| $Ta_2O_5$ | | | | | | | | |
| $TiO_2$ | 1.7 | | | | 1.7 | 1.8 | | 1.7 |
| $WO_3$ | | | | | | | | |
| $Nb_2O_5$ | | | | | | | | |
| $ZrO_2$ | | | | 1.5 | | | | |
| $Ge_2O$ | | | | | | | | |
| $Sb_2O_3$ | 0.1 | 0.1 | 0.02 | 0.02 | 0.04 | 0.05 | 0.1 | 0.02 |
| $SnO_2$ | | | | | | | | |
| Si + Al | 0.0 | 0.0 | 0.0 | 0.0 | 0.0 | 0.0 | 0.0 | 0.0 |
| B/(Si + Al) | — | — | — | — | — | — | — | — |
| Li + K + Na | 1.6 | 0.7 | 0.4 | 0.4 | 1.0 | 0.9 | 0.7 | 0.4 |
| Bi + B + Li + Na + K | 98.1 | 99.8 | 99.9 | 98.4 | 98.2 | 96.6 | 97.8 | 96.6 |
| Ti + W + Nb | 1.7 | 0.0 | 0.0 | 0.0 | 1.7 | 1.8 | 0.0 | 1.7 |
| Bi + B + Li + Na + K + Ti + W + Nb | 99.8 | 99.8 | 99.9 | 98.4 | 99.9 | 98.4 | 97.8 | 98.3 |
| Zn + Ba | 0.0 | 0.0 | 0.0 | 0.0 | 0.0 | 1.4 | 2.0 | 0.9 |
| Zn + Ba + Ca + Sr + Mg | 0.0 | 0.0 | 0.0 | 0.0 | 0.0 | 1.4 | 2.0 | 1.7 |
| La + Gd + Ta | 0.0 | 0.0 | 0.0 | 0.0 | 0.0 | 0.0 | 0.0 | 0.0 |
| Bi/B | 5.6 | 5.0 | 5.0 | 5.3 | 6.1 | 5.3 | 4.9 | 5.3 |
| Refractive Index nd | 2.0825 | 2.0774 | 2.0775 | 2.0779 | 2.0775 | 2.0518 | 2.0413 | 2.0508 |
| Abbe's Number | 18.1 | 18.9 | 18.8 | 18.8 | 18.0 | 18.5 | 18.9 | 18.8 |
| Glass Transition Point (° C.) | 401.0 | 429 | 429 | 429 | 386 | 391 | 415 | 405 |
| Coloration $\lambda_{70}$ (nm) | 451 | 445 | 444 | 447 | 455 | 453 | 452 | 453 |

TABLE 7

| (% by mass) | 49 | 50 | 51 | 52 | 53 | 54 | 55 | 56 |
|---|---|---|---|---|---|---|---|---|
| $Bi_2O_3$ | 81.2 | 81.2 | 80.1 | 78.6 | 78.6 | 77.6 | 80.7 | 81.4 |
| $SiO_2$ | 0.7 | | | | | 1.6 | 2 | |
| $Al_2O_3$ | | 0.7 | | | | | | |
| $B_2O_3$ | 15.8 | 15.8 | 15.8 | 16.1 | 16 | 14.9 | 13.1 | 17.1 |
| $Li_2O$ | 0.5 | 0.5 | | 0.5 | 0.4 | 1 | 0.4 | 0.6 |
| $Na_2O$ | | | 0.2 | | 0.4 | | | |
| $K_2O$ | | | | | | | | |
| CaO | | | | | | | | |
| SrO | | | | | | | | |
| BaO | | | | | | | | |
| MgO | | | | | | | | |
| ZnO | | | | | | | | |
| $La_2O_3$ | | | | | | | | |
| $Gd_2O_3$ | | | 3.9 | | | | | |
| $Ta_2O_5$ | | | | | | | | |
| $TiO_2$ | 1.7 | 1.7 | | | | 4.8 | 1.7 | |
| $WO_3$ | | | | 4.8 | 4.6 | | 2 | 0.9 |
| $Nb_2O_5$ | | | | | | | | |
| $ZrO_2$ | | | | | | | | |
| $Ge_2O$ | | | | | | | | |
| $Sb_2O_3$ | 0.02 | 0.02 | 0.05 | 0.05 | 0.05 | 0.05 | 0.05 | 0.05 |
| $SnO_2$ | 0.01 | | | | | | | |
| Si + Al | 0.7 | 0.7 | 0.0 | 0.0 | 0.0 | 1.6 | 2.0 | 0.0 |
| B/(Si + Al) | 22.6 | 22.6 | — | — | — | 9.3 | 6.6 | — |
| Li + K + Na | 0.5 | 0.5 | 0.2 | 0.5 | 0.8 | 1.0 | 0.4 | 0.6 |
| Bi + B + Li + Na + K | 97.5 | 97.5 | 96.1 | 95.2 | 95.4 | 93.5 | 94.2 | 99.1 |
| Ti + W + Nb | 1.7 | 1.7 | 0.0 | 4.8 | 4.6 | 4.8 | 3.7 | 0.9 |
| Bi + B + Li + Na + K + Ti + W + Nb | 99.2 | 99.2 | 96.1 | 100.0 | 100.0 | 98.3 | 97.9 | 100.0 |
| Zn + Ba | 0.0 | 0.0 | 0.0 | 0.0 | 0.0 | 0.0 | 0.0 | 0.0 |
| Zn + Ba + Ca + Sr + Mg | 0.0 | 0.0 | 0.0 | 0.0 | 0.0 | 0.0 | 0.0 | 0.0 |
| La + Gd + Ta | 0.0 | 0.0 | 3.9 | 0.0 | 0.0 | 0.0 | 0.0 | 0.0 |
| Bi/B | 5.1 | 5.1 | 5.1 | 4.9 | 4.9 | 5.2 | 6.2 | 4.8 |
| Refractive Index nd | 2.0799 | 2.0734 | 2.0865 | 2.0253 | 2.0300 | 2.0268 | 2.0554 | 2.0795 |
| Abbe's Number | 18.7 | 18.8 | 18.8 | 19.2 | 19.0 | 18.7 | 18.6 | 18.8 |

TABLE 7-continued

| (% by mass) | 49 | 50 | 51 | 52 | 53 | 54 | 55 | 56 |
|---|---|---|---|---|---|---|---|---|
| Glass Transition Point (° C.) | 415.0 | 416 | 424 | 428 | 425 | 421 | 410 | 420 |
| Coloration $\lambda_{70}$ (nm) | 451 | 452 | 451 | 445 | 446 | 433 | 454 | 446 |

The individual samples were prepared in the following manner.

First, each set of glass raw materials were mixed together to give a corresponding composition shown in the above tables and melted at 800 to 1050° C. for an hour using a gold crucible. After the melting, the glass melt was allowed to flow on a carbon plate and annealed and, then, glass samples suitable for the respective measurements were produced.

The obtained samples were evaluated for refractive index, Abbe's number, glass transition point, and level of coloration $\lambda_{70}$. The results are shown in Tables 1 to 7.

The refractive index is a value measured for the d-line (587.6 nm) of a helium lamp.

The Abbe's number was calculated using the refractive index at the d-line and the respective refractive indices at the F-line (486.1 nm) and C-line (656.3 nm) of a hydrogen lamp and in accordance with the formula: Abbe's number (vd)= [(nd−1)/(nF−nC)].

The glass transition point was measured by a dilatometer.

For the level of coloration, an optically polished glass sample with a thickness of 10 mm±0.1 mm was measured in terms of transmittance in a wavelength range of 200 to 800 nm at 0.5-nm intervals using a spectro-photometer and determined in terms of wavelength at which the sample exhibited a transmittance of 70%.

Samples Nos. 1 and 34 were evaluated for pressability. This pressability evaluation is an evaluation for the amount of glass components (particularly bismuth) volatilized by heat assumed to be applied in press molding. The pressability evaluation was conducted by placing a sample measuring 5 mm diameter by 5 mm thickness and having a mirror-polished end face on a polished tungsten carbide (WC) plate and subjecting the sample to heat treatment in a nitrogen atmosphere. The heat treatment temperature was the glass transition point plus 20° C. The result is shown in FIG. 1.

As shown in FIG. 1, observation of the state of the WC plate after heat treatment has confirmed that Sample No. 1 is smaller in amount of volatiles containing bismuth as a main component than Sample No. 34 (note that white spots in the photographs of FIGS. 1 and 2 are dust and dirt). Thus, it can be considered that the lower the glass transition point, the less the volatiles during press molding.

INDUSTRIAL APPLICABILITY

Since the optical glass of the present invention has a high refractive index, high dispersion and a superior transmittance, it can enhance the performance of optical pickup lenses in various optical disc systems including CD, MD, DVD and the like and image pickup lenses in video cameras and general cameras. Furthermore, the optical glass can also be used as a glass lens material produced by any method other than press molding.

The invention claimed is:

1. An optical glass having a refractive index nd of 2.0 or more, an Abbe's number vd of 20 or less, a glass transition point of 450° C. or below, and a glass composition, in % by mass, of 70 to 90% $Bi_2O_3$, 4 to 29.9% $B_2O_3$, 0.1 to 10% $Li_2O+Na_2O+K_2O$, 0 to 2% $SiO_2$, and 0 to 2.5% $SiO_2+Al_2O_3$ and being substantially free of lead component, arsenic component, F component, $TeO_2$, and $GeO_2$.

2. The optical glass according to claim 1, wherein $Bi_2O_3/B_2O_3$ is 8 or less in mass ratio.

3. The optical glass according to claim 1, wherein $B_2O_3/(SiO_2+Al_2O_3)$ is 5.5 or more in % by mass.

4. The optical glass according to claim 1, wherein a content of $Bi_2O_3+B_2O_3+Li_2O+Na_2O+K_2O$ is 90% by mass or more.

5. The optical glass according to claim 1, containing 0 to 15% by mass $TiO_2+WO_3+Nb_2O_5$.

6. The optical glass according to claim 1, wherein a content of $Bi_2O_3+B_2O_3+Li_2O+Na_2O+K_2O+TiO_2+WO_3+Nb_2O_5$ is 95% by mass or more.

7. The optical glass according to claim 1, wherein a content of ZnO+BaO is 0 to 2.5% by mass.

8. The optical glass according to claim 1, wherein a content of ZnO+BaO+CaO+SrO+MgO is 0 to 2.5% by mass.

9. The optical glass according to claim 1, wherein a content of $La_2O_3+Gd_2O_3+Ta_2O_5$ is 0 to 10% by mass.

10. The optical glass according to claim 1, wherein a content of $Sb_2O_3$ is 0 to 1% by mass.

11. The optical glass according to claim 1, wherein the level of coloration $\lambda_{70}$ at a thickness of 10 mm is below 500 nm.

12. The optical glass according to claim 1, being for use in press molding.

13. An optical element press-molded from the optical glass according to claim 12.

* * * * *